United States Patent
Meyers et al.

(10) Patent No.: US 9,189,017 B2
(45) Date of Patent: Nov. 17, 2015

(54) PORTFOLIO COVER FOR PORTABLE INFORMATION HANDLING SYSTEMS

(71) Applicants: David Michael Meyers, Round Rock, TX (US); Justin Cole Lyles, San Diego, CA (US); Deeder M. Aurongzeb, Round Rock, TX (US)

(72) Inventors: David Michael Meyers, Round Rock, TX (US); Justin Cole Lyles, San Diego, CA (US); Deeder M. Aurongzeb, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 12 days.

(21) Appl. No.: 14/150,447

(22) Filed: Jan. 8, 2014

(65) Prior Publication Data

US 2015/0192953 A1    Jul. 9, 2015

(51) Int. Cl.
| | |
|---|---|
| *H04M 1/00* | (2006.01) |
| *G06F 1/16* | (2006.01) |
| *H04B 1/3888* | (2015.01) |
| *B32B 38/08* | (2006.01) |
| *B32B 37/14* | (2006.01) |

(52) U.S. Cl.
CPC .............. *G06F 1/1607* (2013.01); *B32B 37/14* (2013.01); *B32B 38/08* (2013.01); *H04B 1/3888* (2013.01)

(58) Field of Classification Search
CPC ....... G06F 1/1607; B32B 37/14; B32B 38/08; H04B 1/3888
See application file for complete search history.

(56) References Cited

U.S. PATENT DOCUMENTS

| | | | |
|---|---|---|---|
| 8,457,701 B2 * | 6/2013 | Diebel | 455/575.8 |
| 2012/0068942 A1 * | 3/2012 | Lauder et al. | 345/173 |
| 2013/0083465 A1 * | 4/2013 | Motoishi et al. | 361/679.21 |

OTHER PUBLICATIONS

Mallikarachchi et al.; "Quasi-Static Folding and Deployment of Ultrathin Composite Tape-Spring Hinges"; Journal of Spacecraft and Rockets, vol. 48, No. 1; pp. 187-198, 2011.

* cited by examiner

*Primary Examiner* — Chuong A Ngo
(74) *Attorney, Agent, or Firm* — Baker Botts L.L.P.

(57) ABSTRACT

A portfolio cover for a portable information handling system may include a display portion and an input device portion and a cover portion separated by two hinge sections. The display portion, the input device portion and the cover portion may be reinforced with a polymer laminate and laminated together, while the hinge sections may remain unlaminated.

21 Claims, 4 Drawing Sheets

PORTFOLIO COVER FOR PORTABLE INFORMATION HANDLING SYSTEMS

BACKGROUND

1. Field of the Disclosure

This disclosure relates generally to portable information handling systems and, more particularly, to a portfolio cover for portable information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Liquid crystal displays (LCDs) are commonly employed for portable information handling systems configured in the form of laptop, notebook, netbook, and tablet computers, among others. The LCD of a typical laptop computer is mounted within a display housing that is hingeably attached to a base housing that contains the keyboard for the notebook computer. Recently various designs for portable information handling systems have been introduced that combine conventional laptop and tablet functionality, also referred to herein as "tablet-laptop" systems, and may employ various types of connections to a base housing, including various types hinges and/or removable attachment mechanisms. Furthermore, with the advent of various mobile operating systems supporting touch operation, integration of touch panels within the LCD assembly of portable information handling systems has become highly relevant to satisfying market expectations.

Simultaneously, certain design aspects of tablet-laptop systems present technical and/or aesthetic challenges for manufacture and usability. For example, different types of keyboards may be used with tablet-laptop systems and many newer keyboard designs are much lighter in weight than in previous laptop systems, which may be desirable for improved portability. However, as a result of the lighter keyboard, when a tablet-laptop system is used in laptop mode, mechanical instability may arise due to weight imbalance. Design efforts to buttress the hinge mechanism in tablet-laptop systems may involve significant complexity and cost, and may further add thickness and weight to the overall package, which is undesirable. Furthermore, when tablet-laptop systems are used in tablet mode, undesirable contact of the keyboard may occur with a working surface on which the tablet-laptop system is placed during use.

Accordingly, it is desirable to have an improved design and a correspondingly improved manufacturing method for portable information handling systems, particularly for tablet-laptop systems, that provides an improved hinge design and provides protection to various components in different modes of use.

SUMMARY

In one aspect, a disclosed method for manufacturing a portfolio cover for a portable information handling system includes preparing a first piece of carbon fiber material to correspond to a width W associated with the portable information handling system and in length to a sum of: a first length of a first portion in the first piece corresponding to an input device of the portable information handling system; a second length of a second portion in the first piece corresponding to a display device of the portable information handling system; a third length of a third portion in the first piece corresponding to a cover for at least one of the display device and the input device; a fourth length of a first hinge section in the first piece between the first portion and the second portion; and a fifth length of a second hinge section in the first piece between the second portion and the third portion. The method may further include preparing a second piece of carbon fiber material to correspond in width to the width W and in length to the first length, including prepregnating the second piece with a thermoplastic material. A first high-strength polymer layer may be laminated to the second piece. The method may also include preparing a third piece of carbon fiber material to correspond in width to the width W and in length to the second length, including prepregnating the third piece with the thermoplastic material. A second high-strength polymer layer may be laminated to the third piece. The method may still further include preparing a fourth piece of carbon fiber material to correspond in width to the width W and in length to the third length, including prepregnating the fourth piece with the thermoplastic material. A low-friction polymer layer may be laminated to the fourth piece. The method may also include prepregnating the first piece with the thermoplastic material at the first portion, the second portion, and the third portion, and forming the portfolio cover by laminating together the prepregnated first piece, the prepregnated second piece, the prepregnated third piece, and the fourth piece. The first hinge section and the second hinge section may remain unprepregnated and/or unlaminated.

Other disclosed aspects include a portfolio cover for a portable information handling system and a portable information handling system including the portfolio cover.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As noted previously, current portable information handling systems may demand ever thinner solutions for LCD/touch assemblies (referred to herein as simply as a "display assembly"). However, as thickness of display assemblies becomes smaller, structural integrity becomes an ever more important issue. As will be described in further detail, the inventors of the present disclosure have developed novel methods and structures disclosed herein for manufacturing ultra-thin display assemblies for use in portable information handling systems.

Particular embodiments are best understood by reference to FIGS. 1, 2, 3A, 3B, 3C, and 4 wherein like numbers are used to indicate like and corresponding parts.

Figure 1:
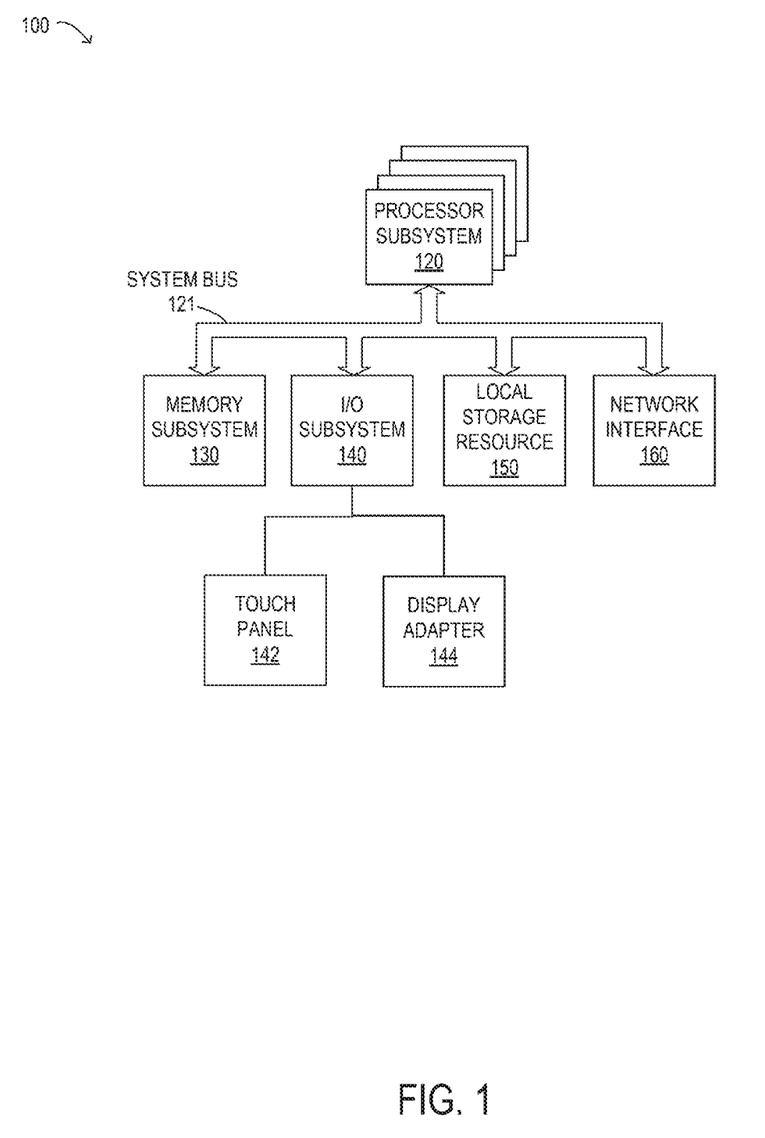
FIG. 1 is a block diagram of selected elements of an embodiment of a portable information handling system.

Turning now to the drawings, FIG. 1 illustrates a block diagram depicting selected elements of an embodiment of portable information handling system 100. As shown in FIG. 1, components of portable information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol and/or standard, including, but not limited to, transmission protocols and/or standards enumerated below with respect to the discussion of network 155. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network coupled to network interface 160 and/or various components associated therewith may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of physical hardware 102). In the same or alternative embodiments, processor subsystem 120 may interpret and/or execute program instructions and/or process data stored remotely (e.g., in a network storage resource).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, network storage resource 170 may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data. In system 100, I/O subsystem 140 may comprise a system, device, or apparatus generally operable to receive and/or transmit data to/from/ within system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with a display for (not shown) that is driven by display adapter 144.

As noted previously, portable information handling systems, such as portable information handling system 100, may be convertible for use as a tablet or a laptop (tablet-laptop). As will be described in further detail herein, the inventors of the present disclosure have discovered that a portfolio cover may be employed as a cover and a structural element, including integrated hinge functionality, with tablet-laptop systems. Such a portfolio cover may be integrated into a housing of a tablet-laptop system and may include hinge sections for hinge functionality between foldable portions of the tablet-laptop system. The portfolio cover may also provide mechanical stability in certain usage arrangements, as well as a protective covering for exposed surfaces in different arrangements, as will now be described in further detail.

Figure 2:
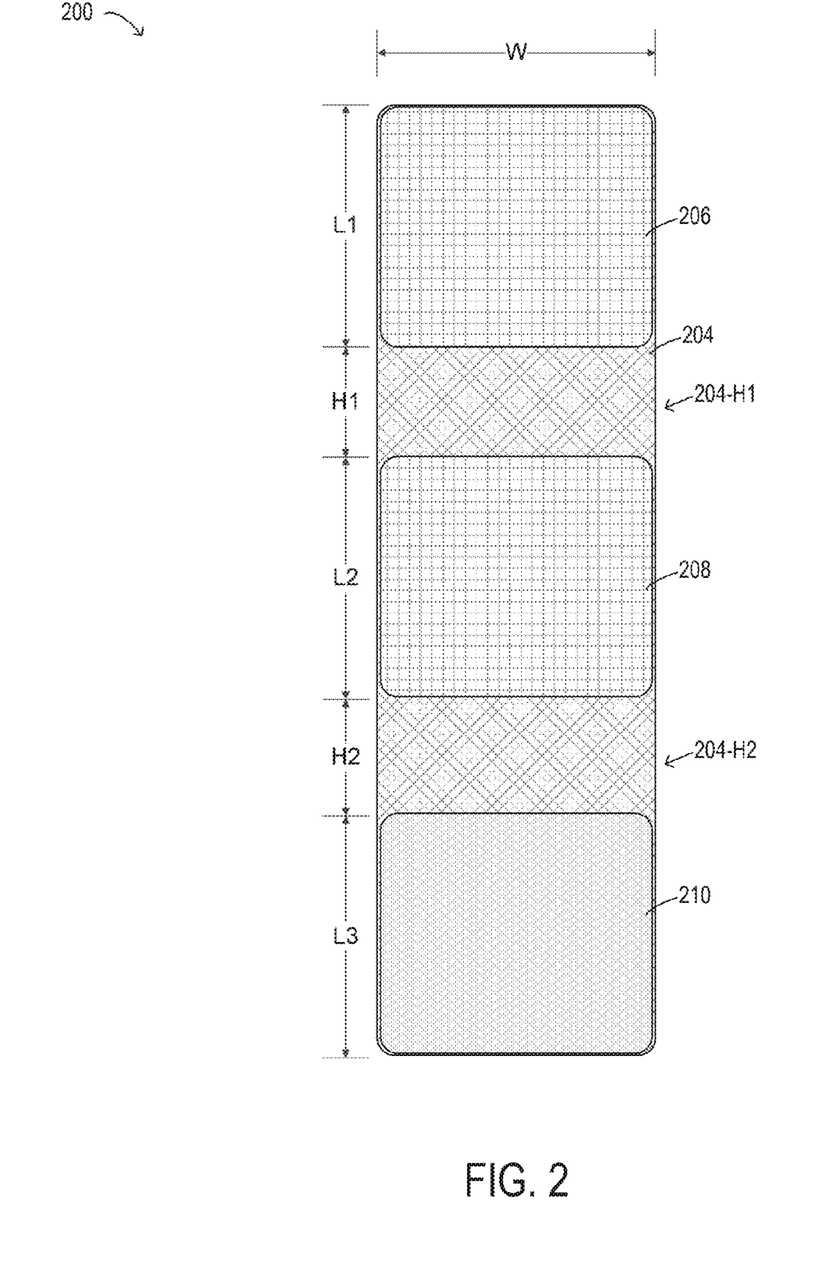
FIG. 2 is a block diagram of selected elements of an embodiment of portfolio cover.

Turning now to FIG. 2, a block diagram of selected elements of an embodiment of portfolio cover 200 is illustrated. In FIG. 2, portfolio cover 200 is shown as an assembly before attachment to an information handling system (see also FIGS. 3A, 3B, and 3C), that may be a tablet-laptop system. As shown in FIG. 2, various elements and/or layers included within portfolio cover 200 are depicted to illustrate a geometric arrangement of portfolio cover 200, while certain elements, such as bonding material and/or finishing material, are not shown for descriptive clarity. Accordingly, a final appearance of portfolio cover 200 may differ from the illustration in FIG. 2, which is intended to show geometry and structural composition.

In FIG. 2, portfolio cover 200 may comprise first piece 204, which may be prepared to have width W and a length represented by the sum of the values L1+L2+L3+H1+H2, as will be specified in further detail. In some embodiments, the values L1, L2, L3, H1, and H2 may vary individually and may be different from one another. In particular embodiments, the values L1, L2, and L3 may be equivalent and/or substantially equivalent among each other and may correspond to a length associated with the tablet-laptop system. In certain embodiments, the values H1 and H2 may be equivalent or substantially equivalent to each other. The width W may correspond to a width associated with the tablet-laptop system and may vary independently of the values L1, L2, L3, H1, and H2.

As shown in FIG. 2, in certain embodiments, first piece 204 may be rectangular in shape and/or substantially rectangular in shape with rounded corners, while a corner radius associated with the corners may be varied, as desired. In different embodiments, first piece 204 may be comprised of a high-strength fabric, such as carbon fiber material, which may provide structural stability, wear resistance, stiffness, durability, and/or a desired aesthetic finish. Length L1 may correspond to a length of an input device included with the tablet-laptop system. Length L2 may correspond to a length of a display device included with the tablet-laptop system. Length L3 may correspond to a length of a cover for at least one of the input device and the display device included with the tablet-laptop system. Between length L1 and length L2, length H1 may correspond to first hinge section 204-H1 between the input device and the display device. Between length L2 and length L3, length H2 may correspond to second hinge section 204-H2 between the display device and the cover.

In FIG. 2, portfolio cover 200 may further comprise second piece 206, which may have width W and length L1 and may represent a strengthening member supporting the input device included with the tablet-laptop system. Portfolio cover 200 may further comprise third piece 208, which may have width W and length L2 and may represent a strengthening member supporting the display device included with the tablet-laptop system. Portfolio cover 200 may further comprise fourth piece 210, which may have width W and length L3 and may represent a low-friction member forming the cover included with the tablet-laptop system. Second piece 206 and third piece 208 may comprise carbon fiber material that has been bonded and/or laminated to a high-strength polymer piece (not shown individually) comprised of a high-strength polymer, such as polyamide, having substantially similar dimensions to the respective piece. Fourth piece 210 may comprise carbon fiber material that has been bonded and/or laminated to a low-friction polymer piece (not shown individually) comprised of a low-friction polymer, such as polyester, having substantially similar dimensions to fourth piece 210.

As shown in FIG. 2, second piece 206 may be bonded and/or laminated to first piece 206 congruent in width W and in a location corresponding to length L1. Third piece 208 may be bonded to first piece 206 congruent in width W and in a location corresponding to length L2. Fourth piece 210 may be bonded to first piece 206 congruent in width W and in a location corresponding to length L3. After bonding of second piece 206, third piece 208, and fourth piece 210 to first piece 204, first hinge section 204-H1 and second hinge section 204-H2 may remain unbonded with a supplemental member and may accordingly remain more flexible than other portions of portfolio cover 200. Selected embodiments of a manufacturing process for forming portfolio cover 200 are described in further detail with respect to FIG. 4. After forming portfolio cover 200, portfolio cover 200 may be bonded or otherwise mechanically integrated into the tablet-laptop system.

In certain embodiments, portfolio cover 200 may include certain accommodations for a wireless antenna included in the tablet-laptop system. The accommodations may include a cut-out or section of first piece 204 that has not been reinforced with a supplemental member. In certain embodiments, portfolio cover 200 may be formed to include a wireless network antenna (i.e., a radio frequency antenna) and may correspondingly include an electrical connector (not shown) for this purpose. In different embodiments, other types of electronic circuitry may be included within or formed within portfolio cover 200.

Figure 3A:
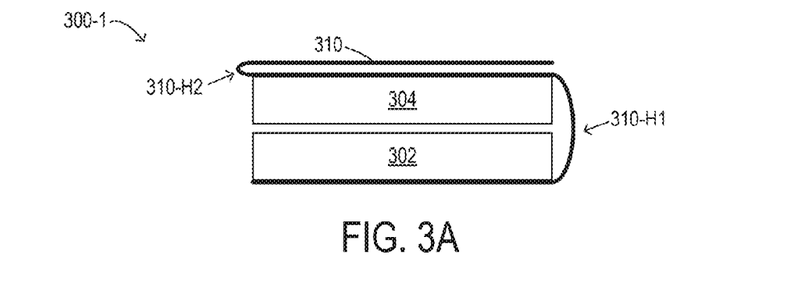
FIGS. 3A, 3B, and 3C are block diagrams of selected elements of an embodiment of a portable information handling system with a portfolio cover.
Figure 3B:
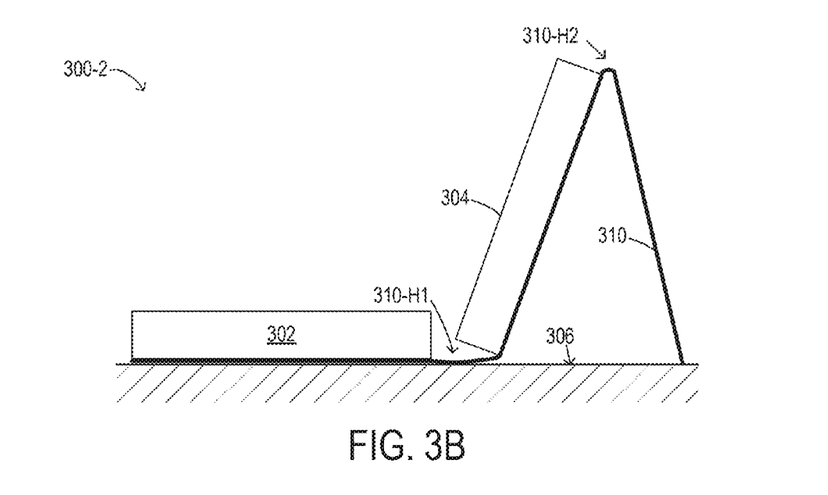
Figure 3C:
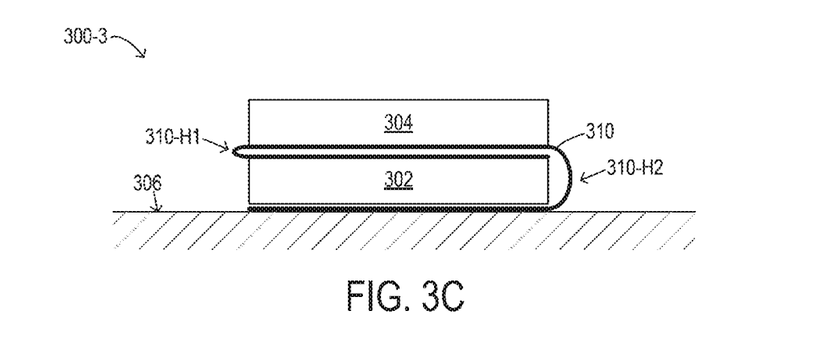

Turning now to FIGS. 3A, 3B, and 3C, block diagrams of selected elements of an embodiment of portable information handling system 300 with portfolio cover 310 are illustrated. The diagrams in FIGS. 3A, 3B, and 3C depict portable information handling system 300 from a side view for descriptive clarity and include input device 302 and display device 304. Input device 302 may represent a keyboard, while display device 304 may represent a display with an integrated touchscreen, and may accordingly also provide tactile input functionality. It is noted that portable information handling system 300 may be a tablet-laptop system.

In FIG. 3A, portable information handling system 300-1 is shown in a closed configuration including input device 302, display device 304, and portfolio cover 310. The closed configuration shown in FIG. 3A may correspond to a conventional laptop in a closed configuration and, in certain embodiments, may be secured with one or more latches (not shown) or other mechanical detention elements (not shown). In FIG. 3A, first hinge section 310-H1 of portfolio cover 310 is visible between input device 302 and display device 304 in the closed configuration, while second hinge section 310-H2 of portfolio cover 310 may be used to fold back the remaining cover portion over display device 304.

In FIG. 3B, portable information handling system 300-2 is shown in an open laptop-style configuration that may be used on working surface 306, which may represent a surface of a desk or a table or similar surface. As shown, portable information handling system 300-2 includes input device 302 and display device 304 in the open configuration for use by a user. In FIG. 3B, first hinge section 310-H1 of portfolio cover 310 is visible between input device 302 and display device 304 in the open configuration, while second hinge section 310-H2 of portfolio cover 310 supports the cover portion of portfolio cover 310 used to support display device 304. Thus, in portable information handling system 300-2, first hinge section 310-H1 and second hinge section 310-H2 of portfolio cover 310 may provide sufficient rigidity to enable usage of display device 304 and input device 302, but yet are still sufficiently flexible to adapt to the configurations shown in FIGS. 3A and 3B, among other configurations (not shown).

In FIG. 3C, portable information handling system 300-3 is shown in a folded tablet-style configuration that may be used on working surface 306, which may represent a surface of a desk or a table or similar surface. Alternatively, portable information handling system 300-3 may be used in a portable manner while held by a user (not shown). As shown, portable information handling system 300-3 includes input device 302 and display device 304 in the folded configuration for use as a tablet. In FIG. 3C, first hinge section 310-H1 of portfolio cover 310 permits input device 302 to be folded behind display device 304 in the folded configuration, while second hinge section 310-H2 of portfolio cover 310 enables the cover portion of portfolio cover 310 to cover and protect input device 302. In certain embodiments of the folded configuration of portable information handling system 300-3, detention mechanisms (not shown) may be used to secure portions of portfolio cover 310 against itself, such as magnets, clasps, snaps, and/or other means for detention.

Figure 4:
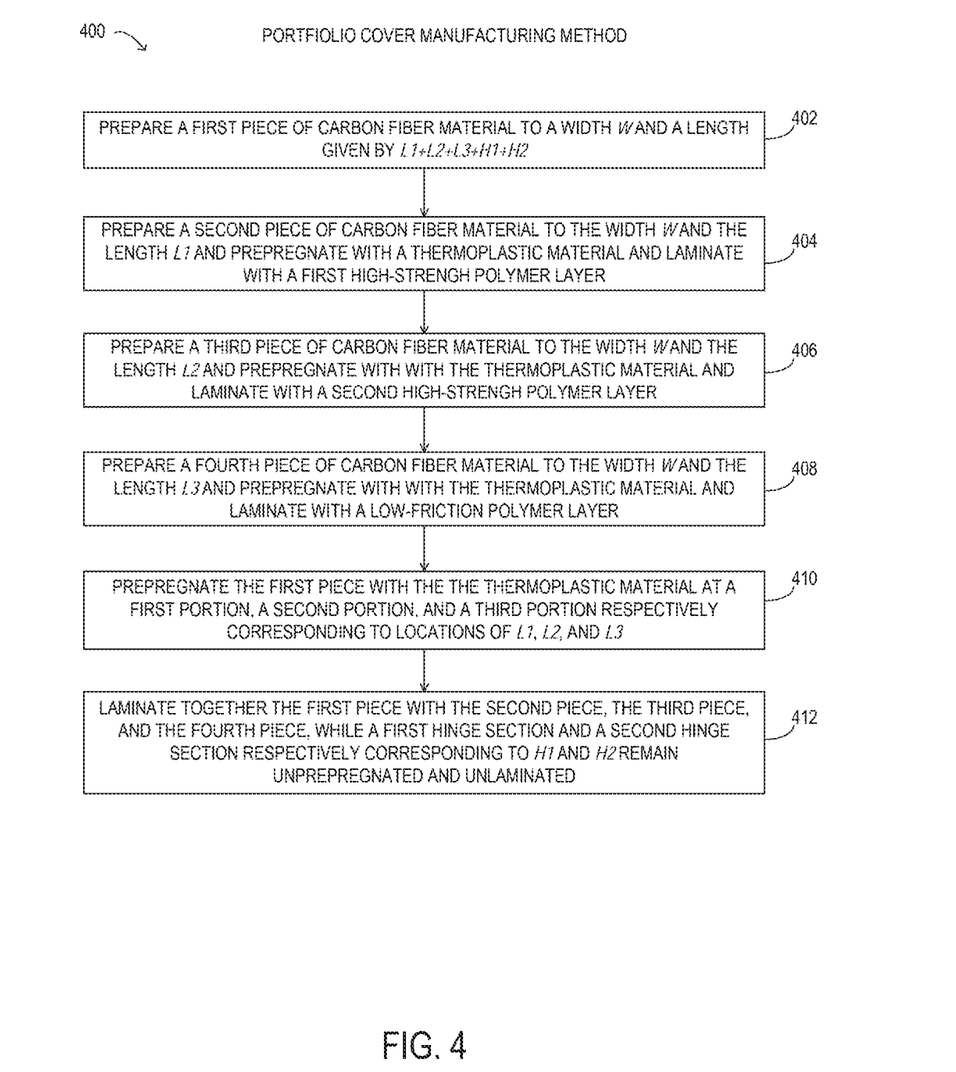
FIG. 4 is flowchart depicting selected elements of an embodiment of a method for manufacturing a portfolio cover.

Referring now to FIG. 4, a block diagram of selected elements of an embodiment of method 400 for manufacturing a portfolio cover, as described herein, is depicted in flowchart form. It is noted that certain operations described in method 400 may be optional or may be rearranged in different embodiments.

In FIG. 4, method 400 may begin by preparing (operation 402) a first piece of carbon fiber material to a width W and a length given by L1+L2+L3+H1+H2. Preparation of the first piece in operation 402 may involve cutting the carbon fiber material to desired dimensions and shape. A second piece of carbon fiber material may be prepared (operation 404) to the width W and the length L1 and prepregnated (operation 404) with a thermoplastic material and laminated (operation 404) with a first high-strength polymer layer. The thermoplastic material may be a thermoplastic resin. Then, a third piece of carbon fiber material may be prepared (operation 406) to the width W and the length L2 and prepregnated (operation 406) with the thermoplastic material and laminated (operation 406) with a second high-strength polymer layer. Next, a fourth piece of carbon fiber material may be prepared (operation 408) to the width W and the length L3 and prepregnated (operation 408) with the thermoplastic material and laminated (operation 408) with a low-friction polymer layer. The first piece may be prepregnated (operation 410) with the thermoplastic material at a first portion, a second portion, and a third portion respectively corresponding to locations of L1, L2, and L3. The first piece may be laminated together (operation 412) with the second piece, the third piece, and the fourth piece, while a first hinge section and a second hinge section respectively corresponding to H1 and H2 remain unprepregnated and unlaminated (operation 412).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for manufacturing a portfolio cover for a portable information handling system, comprising:
   preparing a first piece of carbon fiber material to correspond to a width W associated with the portable information handling system and in length to a sum of:
      a first length of a first portion in the first piece corresponding to an input device of the portable information handling system;
      a second length of a second portion in the first piece corresponding to a display device of the portable information handling system;
      a third length of a third portion in the first piece corresponding to a cover that extends to an entire length of at least one of the display device and the input device;
      a fourth length of a first hinge section in the first piece between the first portion and the second portion; and
      a fifth length of a second hinge section in the first piece between the second portion and the third portion;
   preparing a second piece of carbon fiber material to correspond in width to the width W and in length to the first length, including prepregnating the second piece with a thermoplastic material, wherein a first high-strength polymer layer is laminated to the second piece;
   preparing a third piece of carbon fiber material to correspond in width to the width W and in length to the second length, including prepregnating the third piece with the thermoplastic material, wherein a second high-strength polymer layer is laminated to the third piece;
   preparing a fourth piece of carbon fiber material to correspond in width to the width W and in length to the third length, including prepregnating the fourth piece with the thermoplastic material, wherein a low-friction polymer layer is laminated to the fourth piece;
   prepregnating the first piece with the thermoplastic material at the first portion, the second portion, and the third portion; and
   forming the portfolio cover by laminating together the prepregnated first piece, the prepregnated second piece, the prepregnated third piece, and the fourth piece,
   wherein the first hinge section and the second hinge section remain unprepregnated.

2. The method of claim 1, wherein forming the portfolio cover includes:
laminating the prepregnated second piece to the prepregnated first piece at the first portion;
laminating the prepregnated third piece to the prepregnated first piece at the second portion; and
laminating the prepregnated fourth piece to the prepregnated first piece at the third portion.

3. The method of claim 1, further comprising:
bonding the portfolio cover at the first portion to the display device; and
bonding the portfolio cover at the second portion to the input device.

4. The method of claim 1, wherein the input device includes a keyboard and the display device includes a touch panel.

5. The method of claim 1, wherein the first high-strength polymer layer and the second high-strength polymer layer comprise polyamide.

6. The method of claim 1, wherein the low-friction polymer layer comprises a graphite reinforced polyester.

7. The method of claim 1, wherein at least one of the second piece and the third piece includes an antenna portion for accommodating a wireless communication antenna.

8. The method of claim 1, wherein forming the portfolio cover by laminating includes laminating under pressure, and wherein the thermoplastic material includes a thermoplastic resin.

9. The method of claim 1, wherein the first hinge section and the second hinge section consist of the carbon fiber material.

10. A portfolio cover for a portable information handling system, comprising:
a first piece including carbon fiber material corresponding a width W associated with the portable information handling system and in length to a sum of:
a first length of a first portion in the first piece corresponding to an input device of the portable information handling system;
a second length of a second portion in the first piece corresponding to a display device of the portable information handling system;
a third length of a third portion in the first piece corresponding to a cover that extends to an entire length of at least one of the display device and the input device;
a fourth length of a first hinge section in the first piece between the first portion and the second portion; and
a fifth length of a second hinge section in the first piece between the second portion and the third portion;
a second piece including carbon fiber material and laminated to a first high-strength polymer layer, the second piece corresponding in width to the width W and in length to the first length;
a third piece including carbon fiber material and laminated to a second high-strength polymer layer, the third piece corresponding in width to the width W and in length to the second length; and
a fourth piece including carbon fiber material and laminated to a low-friction polymer layer, the fourth piece corresponding in width to the width W and in length to the third length,
wherein the first piece, the second piece, the third piece, and the fourth piece are laminated together, and wherein the first hinge section and the second hinge section remain unlaminated.

11. The portfolio cover of claim 10, wherein:
the second piece is laminated to the first piece at the first portion;
the third piece is laminated to the first piece at the second portion; and
the fourth piece is laminated to the first piece at the third portion.

12. The portfolio cover of claim 10, wherein the input device includes a keyboard and the display device includes a touch panel, and wherein:
the display device is bonded to the portfolio cover at the first portion;
the input device is bonded to the portfolio cover at the second portion.

13. The portfolio cover of claim 10, wherein the first high-strength polymer layer and the second high-strength polymer layer comprise polyamide, and wherein the low-friction polymer layer comprises a graphite reinforced polyester.

14. The portfolio cover of claim 10, wherein at least one of the second piece and the third piece includes an antenna portion for accommodating a wireless communication antenna.

15. The portfolio cover of claim 10, wherein the first hinge section and the second hinge section consist of the carbon fiber material.

16. A portable information handling system, comprising:
a display device;
an input device; and
a portfolio cover, comprising:
a first piece including carbon fiber material corresponding a width W associated with the portable information handling system and in length to a sum of:
a first length of a first portion in the first piece corresponding to the input device;
a second length of a second portion in the first piece corresponding to the display device;
a third length of a third portion in the first piece corresponding to a cover that extends to an entire length of at least one of the display device and the input device;
a fourth length of a first hinge section in the first piece between the first portion and the second portion; and
a fifth length of a second hinge section in the first piece between the second portion and the third portion;
a second piece including carbon fiber material and laminated to a first high-strength polymer layer, the second piece corresponding in width to the width W and in length to the first length;
a third piece including carbon fiber material and laminated to a second high-strength polymer layer, the third piece corresponding in width to the width W and in length to the second length; and
a fourth piece including carbon fiber material and laminated to a low-friction polymer layer, the fourth piece corresponding in width to the width W and in length to the third length,
wherein the first piece, the second piece, the third piece, and the fourth piece are laminated together, and wherein the first hinge section and the second hinge section remain unlaminated.

17. The portable information handling system of claim 16, wherein:
the second piece is laminated to the first piece at the first portion;

the third piece is laminated to the first piece at the second portion; and the fourth piece is laminated to the first piece at the third portion.

18. The portable information handling system of claim 16, wherein the input device includes a keyboard and the display device includes a touch panel, and wherein:

the display device is bonded to the portfolio cover at the first portion;

the input device is bonded to the portfolio cover at the second portion.

19. The portable information handling system of claim 16, wherein the first high-strength polymer layer and the second high-strength polymer layer comprise polyamide, and wherein the low-friction polymer layer comprises a graphite reinforced polyester.

20. The portable information handling system of claim 16, wherein the portable information handling system comprises a wireless communication antenna, and wherein at least one of the second piece and the third piece includes an antenna portion for accommodating the wireless communication antenna.

21. The portable information handling system of claim 16, wherein the first hinge section and the second hinge section consist of the carbon fiber material.

* * * * *